UNITED STATES PATENT OFFICE.

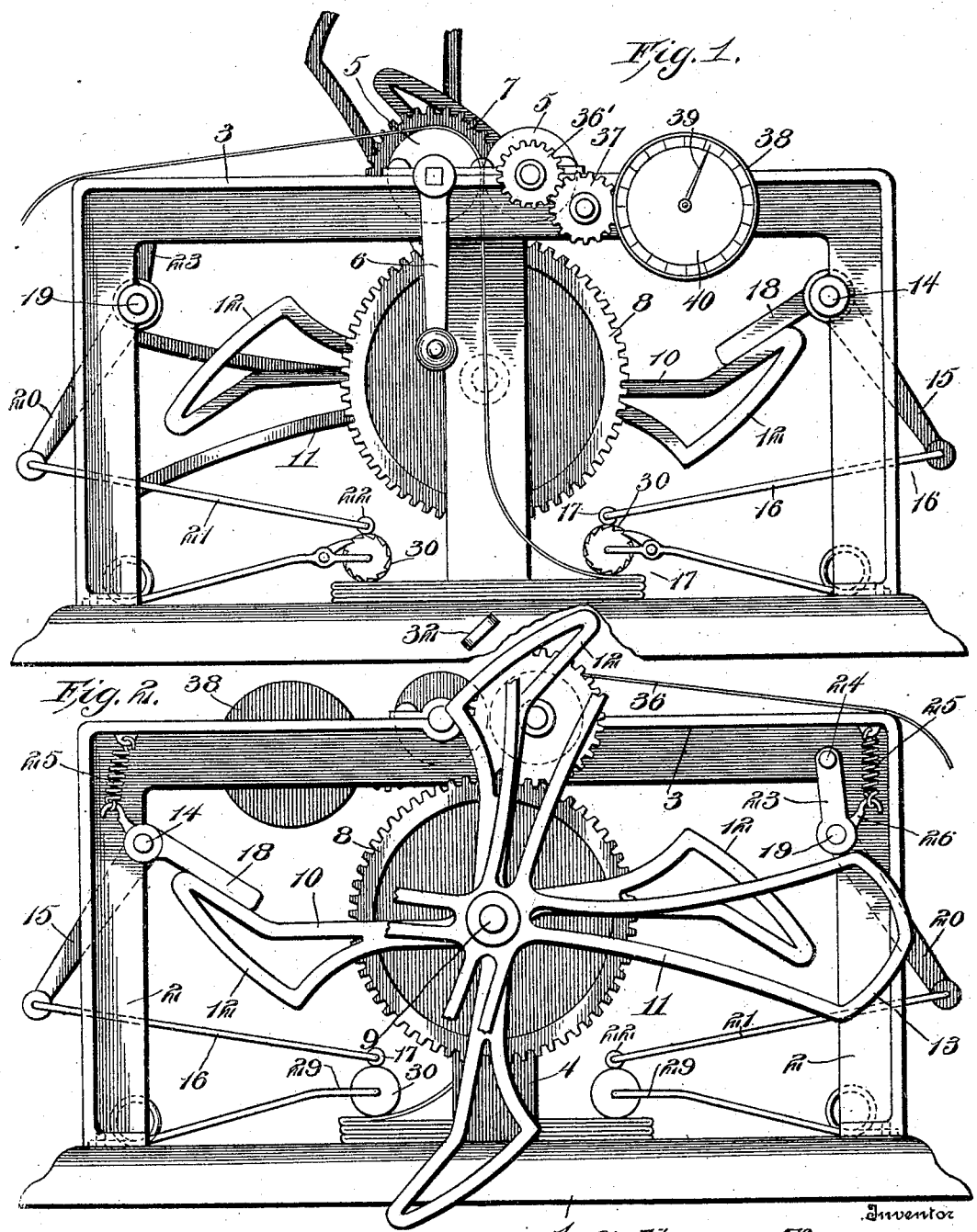

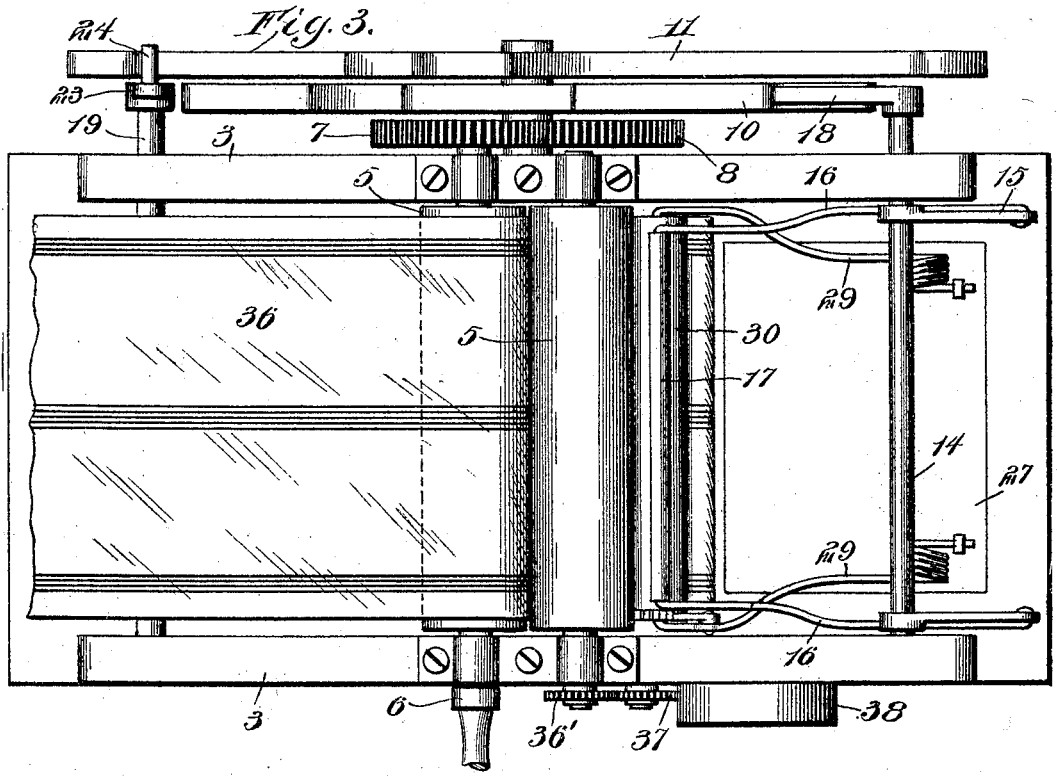

CALHOUN NORMAN, OF CEDARVILLE, WEST VIRGINIA.

CLOTH FOLDING AND MEASURING DEVICE.

No. 795,727.          Specification of Letters Patent.          Patented July 25, 1905.

Application filed September 20, 1904. Serial No. 225,287.

*To all whom it may concern:*

Be it known that I, CALHOUN NORMAN, a citizen of the United States, residing at Cedarville, in the county of Gilmer and State of West Virginia, have invented new and useful Improvements in Cloth Folding and Measuring Devices, of which the following is a specification.

This invention relates to cloth folding and measuring devices designed especially for use in dry-goods stores for measuring and folding dry goods while being retailed, and has for its objects to produce a comparatively simple and inexpensive device of this character which in practice will accurately measure the material, fold the same in neat compact form for bundling, and register the amount of material passed through the machine.

A further object of the invention is to provide means whereby the folded or bundled material may be readily removed from the machine after the desired quantity has been measured.

With these and other objects in view the invention comprises the novel features of construction and combination of parts more fully hereinafter described.

In the accompanying drawings, Figure 1 is a front elevation of a machine embodying the invention. Fig. 2 is a rear elevation of the same, parts thereof being broken away. Fig. 3 is a top plan view of the same. Fig. 4 is a vertical longitudinal section centrally through the base-frame.

Referring to the drawings, 1 designates a hollow base, to which is secured in any appropriate manner a pair of spaced vertical side members arranged in alinement and respectively at the front and rear of the machine and each comprising a pair of vertical standards 2 and an overhead horizontal connection portion or rail 3, there being also arranged at the rear of the machine a central vertical standard 4, connected at its ends respectively to the base and adjacent horizontal rail 3.

Journaled in suitable bearings carried by the rails 3 is a pair of coöperating frictional feed-rollers 5, one of which has fixed to one end thereof an operating-crank 6 and to its other end a gear 7 in mesh with a gear 8, fixed upon a rotary stub-shaft 9, journaled to the frame-standard 4, there being further fixed upon the shaft 9 for rotation therewith a primary actuating member or spider 10 and a secondary actuating member or spider 11, these spiders being so arranged upon the shaft that one will travel slightly in advance of the other. The spider 10 is in form of four radiating arms each terminating at its outer end in a cam-head 12 of appropriate form, while the spider 11 likewise comprises four radiating arms terminating at their outer ends in cam-heads 13, it being understood that the cam-heads 12 and 13 may be of the form herein shown or of other form adapting them for the purposes in hand.

Journaled in suitable bearings between a pair of the standards 2 is a horizontal shaft 14, which has fixed thereon a pair of oppositely disposed and spaced levers 15, to the longer arms of which is attached for operation a reciprocatory primary folder member, preferably comprising a U-shaped wire frame 16 and a roller 17, attention being directed to the fact that the rear lever 15 is in the form of a bell-crank having an arm 18, which normally lies in the path of the cam-heads 12, while between the other pair of standards 2 there is extended and journaled for rotation in suitable bearings a shaft 19, having a pair of levers 20, to the lower ends of which is attached a secondary folder member in the form of a U-shaped frame 21, having journaled therein a bearing-roller 22, there being fixed to the rear end of the shaft 19 an arm 23, having a horizontally-projecting portion or pin 24, which normally lies in the path of the cam-heads 13. The shafts 14 and 19 are maintained in position with the arms 18 and 23 in the path of the respective cams by means of normally contracted springs 25, each engaged at one end with the frame and at the other end with a projecting finger 26, fixed upon the adjacent shaft.

The base 1 has in its upper face and adjacent to its ends movable portions or sections 27, centrally pivoted, as at 28, and adapted to rock on their pivots in a vertical plane, and to each of the sections 27 there is attached, by means of a spring-frame 29, a clamping member or roller 30, these rollers 30 being oppositely disposed and appropriately spaced to engage and clamp, respectively, the adjacent edges of the folded material, while a shaft 31, having at its forward end a button 32, is extended transversely through the base at the longitudinal center of the latter and has fixed thereon a head 33, connected by links 34 with depending portions or lugs 35, attached to and arranged at the outer edges of the tilting sections 27.

In practice the material 36 to be measured and folded is drawn from the bolt and passed between the feed-rollers 5 and has one of its ends engaged beneath one of the members 30. The rollers 5 are then driven by means of the crank 6, thereby feeding the material into the machine, and during this feeding operation the gear 7 acts upon the master-gear 8 for rotating the shaft 9, thereby rotating the primary and secondary operating members 10 and 11 in the direction indicated by the arrow in Fig. 2. During the movement of the parts one of the cam-heads 13 first comes into contact with the projecting portion 24 of arm 23, thereby rocking the shaft 19 and causing the folder member 21 22 to pass over the adjacent clamping member 30 and carry the material across the base and force the same beneath the opposite clamping member 30. One of the cam-heads 12 then comes in contact with the arm 18, thereby actuating the other folder member 16 17, which in turn passes over the adjacent clamping member 30 and feeds the material backward upon itself across the base and beneath the other clamping member, thereby folding the material into a neat compact bundle in which the layers will be preferably a quarter of a yard in length, this length being determined by the circumference of the rollers 5, which in the present instance will be nine inches. Thus it will be seen that during each revolution of the rollers 5 a layer of the material is folded by one of the folder members, which latter operate successively, thereby folding the material back and forth upon itself, as illustrated in the drawings. After the desired quantity of the material has been drawn off from the bolt and severed therefrom in any appropriate manner the folded bundle may be readily removed from beneath the clamping members by grasping the button 32 and turning the same to move the parts to the dotted position illustrated in Fig. 4, which raises the clamps and frees the bundle.

One of the rollers 5 has fixed on its forward end a gear-pinion 36' in mesh with a similar pinion 37, which in turn drives mechanism within a dial-case 38 for actuating a pointer 39 to move the same over a dial 40, which is graduated to indicate yards and fractions of yards. In the present instance the dial is graduated to indicate quarter-yards, and at each rotation of the crank 6, which, as before stated, feeds into the machine and folds a quarter of a yard of the material, the pointer 39 will be moved one step, whereby the amount of material to be measured by the machine will be readily and accurately indicated.

From the foregoing it is apparent that I produce a simple efficient device admirably adapted for the attainment of the ends in view, it being understood that minor changes in the details herein set forth may be resorted to without departing from the spirit of the invention.

Having thus fully described the invention, what is claimed as new is—

1. In a device of the class described, a feeding mechanism, a pair of oppositely-disposed independent folder members, and operative connections between the feeding mechanism and folders for successively and alternately actuating the latter during the feeding operation.

2. In a device of the class described, a feeding mechanism, a pair of oppositely-disposed independently-movable folder members, means for maintaining the members normally in retracted position, and means driven by the feeding mechanism for successively and alternately actuating the folders during the feeding operation.

3. In a device of the class described, a feeding mechanism, a pair of oppositely-disposed independently-movable folder members, springs for maintaining the members normally in retracted position, and means driven by the feeding mechanism for successively and alternately actuating the folders during the feeding operation.

4. In a device of the class described, a feeding mechanism, a pair of oppositely-disposed and independently-movable folder members, cam members operatively connected with and driven by the feeding mechanism for successively and alternately actuating the folders, and means for returning the folders automatically to their normal retracted positions after each operation by the cam members.

5. In a device of the class described, a feeding mechanism, means for operating the same, a pair of oppositely-disposed folding devices, and cam members operatively connected with and driven by the feeding mechanism, said cam members being adapted to successively and alternately actuate the folders.

6. In a device of the class described, a pair of feed-rollers, means for driving the same, a pair of oppositely-disposed folders, a shaft, operative connections between one of the feed-rollers and shaft for rotating the latter, and a pair of actuating members fixed upon the shaft and having cam-heads designed to act upon and alternately operate the folders.

7. In a device of the class described, a pair of feed-rollers, means for driving the same, a pair of oppositely-disposed folders having crank-arms, a pair of rotary actuating members having cam-heads adapted to act respectively on the crank-arms, and operative connections between one of the feed-rollers and actuating members for driving the latter during the feeding operation.

8. In a device of the class described, a feeding mechanism, a folding mechanism, clamping members adapted for engagement with opposite edges of the folded material, a pair of pivoted rocking members operatively connected with and carrying the respective clamping members, and means for simultaneously rocking the members to move the clamping members to non-engaging position.

In testimony whereof I affix my signature in presence of two witnesses.

CALHOUN NORMAN.

Witnesses:
G. RENNIE,
F. D. BURK.